(12) United States Patent
Liu et al.

(10) Patent No.: US 11,062,460 B2
(45) Date of Patent: Jul. 13, 2021

(54) REPRESENTATION LEARNING USING JOINT SEMANTIC VECTORS

(71) Applicant: Adobe Inc., San Jose, CA (US)

(72) Inventors: Xingyu Liu, Menlo Park, CA (US); Hailin Jin, San Jose, CA (US); Joonyoung Lee, Milpitas, CA (US)

(73) Assignee: Adobe Inc., San Jose, CA (US)

( * ) Notice: Subject to any disclaimer, the term of this patent is extended or adjusted under 35 U.S.C. 154(b) by 80 days.

(21) Appl. No.: 16/274,481

(22) Filed: Feb. 13, 2019

(65) Prior Publication Data
US 2020/0258241 A1    Aug. 13, 2020

(51) Int. Cl.
*G06T 7/246* (2017.01)
*G06K 9/62* (2006.01)
*G06K 9/00* (2006.01)

(52) U.S. Cl.
CPC .......... *G06T 7/246* (2017.01); *G06K 9/00718* (2013.01); *G06K 9/00744* (2013.01); *G06K 9/6276* (2013.01); *G06T 2207/20084* (2013.01)

(58) Field of Classification Search
CPC combination set(s) only.
See application file for complete search history.

(56) References Cited

U.S. PATENT DOCUMENTS

| | | | | |
|---|---|---|---|---|
| 2006/0200253 A1* | 9/2006 | Hoffberg | ................ | G05B 15/02 700/19 |
| 2011/0033122 A1* | 2/2011 | Le Roux | ................ | G06K 9/62 382/226 |
| 2015/0131851 A1* | 5/2015 | Bernal | ................ | G06T 7/194 382/103 |
| 2015/0213361 A1* | 7/2015 | Gamon | ................ | G06N 20/00 706/12 |
| 2015/0310459 A1* | 10/2015 | Bernal | ............... | G06Q 30/0201 705/7.29 |
| 2015/0348591 A1* | 12/2015 | Kaps | ................ | G11B 27/031 386/201 |
| 2016/0292509 A1* | 10/2016 | Kaps | ................ | A63F 13/00 |

(Continued)

OTHER PUBLICATIONS

Kai-Wen,"Video Anomaly Detection and Localization Using Hierarchical Feature Representation and Gaussian Process Regression ",The IEEE Conference on Computer Vision and Pattern Recognition (CVPR), 2015, pp. 2909-2917.*

(Continued)

*Primary Examiner* — Omar S Ismail
(74) *Attorney, Agent, or Firm* — Shook, Hardy & Bacon L.L.P.

(57) ABSTRACT

Technology is disclosed herein for learning motion in video. In an implementation, an artificial neural network extracts features from a video. A correspondence proposal (CP) module performs, for at least some of the features, a search for corresponding features in the video based on a semantic similarity of a given feature to others of the features. The CP module then generates a joint semantic vector for each of the features based at least on the semantic similarity of the given feature to one or more of the corresponding features and a spatiotemporal distance of the given feature to the one or more of the corresponding features. The artificial neural network is able to identify motion in the video using the joint semantic vectors generated for the features extracted from the video.

20 Claims, 7 Drawing Sheets

(56) References Cited

U.S. PATENT DOCUMENTS

| | | | | |
|---|---|---|---|---|
| 2016/0300127 | A1* | 10/2016 | Heifets | G06K 9/52 |
| 2017/0150235 | A1* | 5/2017 | Mei | G06F 40/253 |
| 2018/0025749 | A1* | 1/2018 | Oh | G06K 9/6218 |
| | | | | 386/278 |
| 2018/0137360 | A1* | 5/2018 | Hussein | G06N 3/08 |
| 2019/0147610 | A1* | 5/2019 | Frossard | G06T 7/90 |
| | | | | 382/103 |

OTHER PUBLICATIONS

Fanyi Xiao,"Track and Segment: An Iterative Unsupervised Approach for Video Object Proposals",The IEEE Conference on Computer Vision and Pattern Recognition (CVPR), 2016, pp. 933-942.*

Lei Wang,"Human Action Recognition by Learning Spatio-Temporal Features With Deep Neural Networks",Received Feb. 12, 2018, accepted Mar. 12, 2018, date of publication Mar. 19, 2018, date of current version Apr. 23, 2018.,Digital Object Identifier 10.1109/ACCESS.2018.2817253, p. 17913-17922.*

Zuxuan Wu,"Modeling Spatial-Temporal Clues in a Hybrid Deep Learning Framework for Video Classification",IEEE Transactions on Multimedia ( vol. 20 , Issue: 11 , Nov. 2018),pp. 3137-3147.*

Zhaofan Qiu,"Learning Deep Spatio-Temporal Dependence for Semantic Video Segmentation",IEEE Transactions on Multimedia, vol. 20, No. 4, Apr. 2018,pp. 939-946.*

Donahue, J., Anne Hendricks, L., Guadarrama, S., Rohrbach, M., Venugopalan, S., Saenko, K., & Darrell, T. (2015). Long-term recurrent convolutional networks for visual recognition and description. In Proceedings of the IEEE conference on computer vision and pattern recognition (pp. 2625-2634).

Simonyan, K., & Zisserman, A. (2014). Two-stream convolutional networks for action recognition in videos. In Advances in neural information processing systems (pp. 568-576).

Tran, D., Bourdev, L., Fergus, R., Torresani, L., & Paluri, M. (2015). Learning spatiotemporal features with 3d convolutional networks. In Proceedings of the IEEE international conference on computer vision (pp. 4489-4497).

Wang, L., Li, W., Li, W., & Van Gool, L. (2018). Appearance-and-relation networks for video classification. In Proceedings of the IEEE conference on computer vision and pattern recognition (pp. 1430-1439).

Wang, X., Girshick, R., Gupta, A., & He, K. (2018). Non-local neural networks. In Proceedings of the IEEE conference on computer vision and pattern recognition (pp. 7794-7803).

Qi, C. R., Su, H., Mo, K., & Guibas, L. J. (2017). Pointnet: Deep learning on point sets for 3d classification and segmentation. In Proceedings of the IEEE conference on computer vision and pattern recognition (pp. 652-660).

Qi, C. R., Yi, L., Su, H., & Guibas, L. J. (2017). Pointnet++: Deep hierarchical feature learning on point sets in a metric space. In Advances in neural information processing systems (pp. 5099-5108).

Wang, Y., Sun, Y., Liu, Z., Sarma, S. E., Bronstein, M. M., & Solomon, J. M. (2019). Dynamic graph cnn for learning on point clouds. ACM Transactions on Graphics (tog), 38(5), 1-12.

\* cited by examiner

REPRESENTATION LEARNING USING JOINT SEMANTIC VECTORS

TECHNICAL FIELD

Aspects of the disclosure are related to the field of machine learning and artificial intelligence, and in particular, to representation learning in artificial neural networks.

BACKGROUND

Machine learning has progressed to a point where artificial neural networks routinely perform learning (or recognition) tasks with a level of confidence the same as or even surpassing humans. For example, machine learning is now capable of highly accurate image classification, object detection, semantic segmentation, and image parsing. However, learning motion in video remains an area of difficulty.

Video can be considered a sequence of images changing over time. To successfully model motion representations in video, machine learning models recognize both the features in the static images of the video and the correspondence of the features across frames. Previous solutions involve a first step of extracting features from the images that make up a video, such as objects, edges, or the like. In a second step, correspondences between the features are identified. For example, an object in one frame may be determined to correspond to one or more objects in other frames. This relationship can be expressed in several ways such as the temporal distance between objects or the distance in feature space between objects. The extracted data—the features and their correspondences—are then fed into an artificial neural network capable of recognizing motion (or other patterns) in the data.

In order to recognize patterns in data, the artificial neural networks are configured during a training phase with data for which the outcomes are known. In a highly simplified example, an artificial neural network is composed of layers of neurons. The layers are connected to each other in various ways and the neurons fire in response to various inputs. The inputs at the first layer are the data being analyzed such as a volume of data descriptive of video. The outputs at the final layer represent what the neural network has learned or recognized. In between are intermediate or "hidden" layers that perform additional processing.

Each neuron has a rule that tells the neuron to fire (or not) based on its input. The inputs are weighted, and the weights can be changed based on a feedback process. In the case of video data, the inputs to the first layer of an artificial neural network are vectors populated with numerical or symbolic descriptions of properties of the video data. The inputs to the hidden layers are the outputs of the neurons in the first layer. Within the hidden layers, the outputs from one layer are the inputs to a subsequent layer. The last layer of the artificial neural network takes the output of the last hidden layer as input and itself outputs values that identify what was learned as the signals passed through the various layers of neurons.

During the training phase of a neural network, the weights associated with the neurons are changed based on the difference between the outcome produced by the neural network and the correct classification of the input to the neural network. Over time, and after many cycles of feedback, the weights are configured such that the neural network can accurately recognize new data. The final configuration of the weights and neurons is considered a model of the subject matter being examined such as a facial recognition model, a speech recognition model, or—in the case of motion in video—a motion representation model.

Various approaches to recognizing motion in video model the correspondence between features in different ways. For instance, one approach describes the correspondence of features across frames by their temporal relationships, while another approach models pixel flows across images, while still another approach models the distance in feature space between feature pairs. Unfortunately, these approaches struggle when presented with fast motion or low frame rates because of the challenging behavior of the features (e.g. objects) in the video. For instance, the features may not appear in every frame and, even when they do appear, they may be found in frames that are very far apart. In another example, features may deform or change their pose from frame to frame, further inhibiting the performance of the models.

In a first approach, a convolutional neural network is used to extract the features in a video, each of which can be described by a semantic vector. Convolutional neural networks work by focusing the neurons in the hidden layers on limited receptive fields. Whereas in fully connected neural networks every neuron in one layer is connected to every neuron in another layer, in convolutional neural networks, each neuron is only connected to a restricted number of neurons in other layers. This allows convolutional neural networks to identify specific features wherever they may be located in an image and thus are well suited to feature extraction.

Returning to the first approach, the convolutional neural network identifies the objects, edges, or other such elements that appear in each frame of the video. Their corresponding semantic vectors describe numerical or symbolic characteristics of the features. A recurrent neural network is then used to detect the temporal relationships between the features. However, recurrent neural networks have performed poorly on benchmarks and are hard to train due to the exploding gradient problem and the vanishing gradient problem.

A second approach also employs a convolutional neural network to recognize the features in a video, coupled with an optical flow branch to model correspondence across frames. The results of the convolutional neural network and the optical flow analysis are then sent into a deep neural network. This technique has not worked well on benchmark data because the optical flow branch captures pixel-level flows, as opposed to feature-level correspondence.

Finally, a three-dimensional convolutional neural network has been employed with RGB-only inputs to learn dynamic changes jointly and implicitly with static appearance. This approach is able to recognize short-range motion of features in a video. However, the convolution functions operate locally and thus are unable to learn the long-range motion that occurs with fast moving objects or low frame fates.

Non-local neural networks have been proposed for overcoming this problem, where the recognized features are globally re-weighted by their pair-wise feature distance. Coupled with three-dimensional convolutional neural networks, non-local neural networks can learn long-range motion, but not very effectively. Rather, the re-weighted features create too much noise, which results in error prone motion classifications.

It may thus be appreciated that, while machine learning technology has achieved impressive results with respect to many types of recognition tasks, recognizing motion in video remains a daunting challenge. More generally, recognizing behavior in many types of data sets analogous to video remains a challenge, too. For example, some dynamic data sets can be visualized as a series of changing images. Recognizing dynamic behavior in such data sets can be as problematic and difficult as recognizing motion in video.

BRIEF SUMMARY

Enhancements to correspondence proposals are disclosed herein that improve the learning of motion in video and the learning of behaviors in dynamic data more generally. In an implementation, a correspondence proposal module (CP module) focuses on semantically similar feature pairs in a video and considers positional information of the feature pairs in the video. The CP module produces joint semantic vectors that have semantic and positional information for the feature pairs implicitly encoded therein. The joint semantic vectors are fed into an artificial neural network, which may then recognize motion in the video using the joint semantic vectors as input. The focus on semantically similar feature pairs and the addition of positional information represent an advance over previous solutions and result in improved motion learning in video relative to the performance of other approaches against popular benchmarks.

In an implementation, an artificial neural network extracts features from a video. The CP module performs a search for corresponding features in the video based on a semantic similarity of a given feature to others of the features. The CP module then generates a joint semantic vector for each of the features based at least on the semantic similarity of the given feature to one or more of the corresponding features and a spatiotemporal distance of the given feature to the one or more of the corresponding features. The artificial neural network identifies motion in the video using the joint semantic vectors generated by the CP module.

This Brief Summary is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
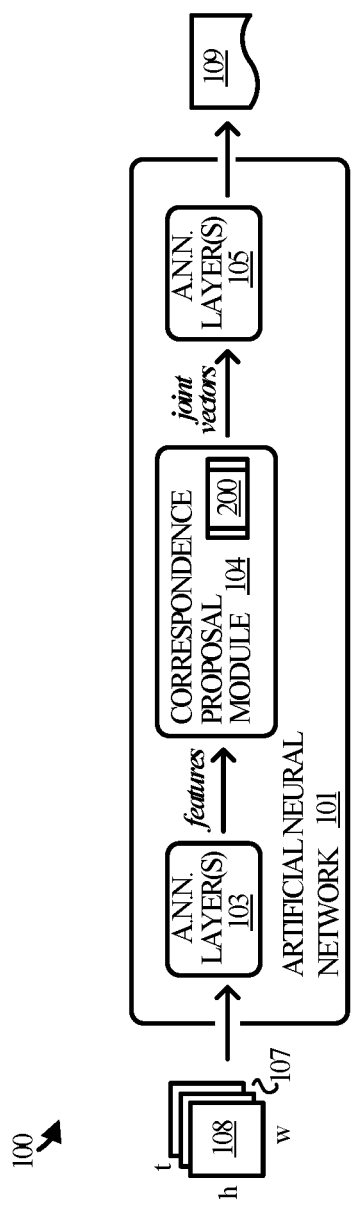
FIG. 1 illustrates a learning architecture in an implementation.

A correspondence proposal (CP) module is disclosed herein that may be inserted into an artificial neural network to enhance the data used by the neural network to classify motion, action, or other such dynamic behavior in video, image data, or the like. The CP module enhances the learning of motion in video by producing joint semantic vectors that have both semantic and spatiotemporal information about extracted features encoded therein. In addition, the CP module selects the corresponding features that are considered when producing the joint semantic vectors based on their semantic similarity to a given feature. The artificial neural network takes the joint semantic vectors as input and outputs one or more learned motions represented in the video.

The inclusion of spatiotemporal information in the joint semantic vectors represents an advance over previous approaches to the problem of learning motion in video. The consideration of semantic similarity when identifying the corresponding features represents another advance. The combination of both strategies allows the artificial neural network to more accurately recognize long-range motion in video than previous solutions. This is because the spatiotemporal information allows the artificial neural network to consider where in their respective frames each feature of a correspondence pair is located. In addition, selecting the corresponding features (which form the correspondence pairs with a given feature) based on semantic similarity to the given feature narrows the field of possible features in other frames that might be the same as a given feature. The semantic (appearance) and spatiotemporal (motion) information that is implicitly encoded in the joint semantic vectors represents an enriched set of data that, as it is fed into the artificial neural network during the training stages and learning stages of operation, improves the ability of the artificial neural network to recognize motion in video.

In an implementation, a main artificial neural network extracts features from a video and provides both semantic and positional information for each feature. Examples of features include objects, edges, pixels, or other such elements that may be extracted from the video. The semantic information describes numerically or symbolically one or more properties of a given feature such as its color components, length, area, circularity, gradient magnitude, gradient direction, texture, or grey-scale intensity, for example. The positional information describes a feature by its spatial position in a frame and its temporal position in the video. Thus, the positional information describes the spatiotemporal position of a given feature.

The CP module performs two main functions: feature grouping and motion embedding. That is, the CP module finds and groups a set of corresponding features for each feature extracted from the video and then generates a joint semantic vector for each feature that has the appearance and motion of the feature encoded therein. The CP module searches for the corresponding features based on a semantic similarity of a given feature to others of the features. In some cases, the search is a nearest neighbor search for the top-k most similar features.

The corresponding features are each described by their semantic information and spatiotemporal information. The semantic information may be represented in semantic vectors that include numbers or symbols describing characteristics of a feature.

The spatiotemporal information may be the location of a feature in the video described in terms of the height (H), the width (W), and the frame (T) in the video where the feature may be found. In some cases, the semantic and spatiotemporal information may be combined in a video representation tensor viewed by the CP module as a point cloud of features with T×H×W points.

The CP module uses the semantic information and spatiotemporal information for the corresponding features to generate a joint semantic vector for each given feature. The resulting joint semantic vector thus has the appearance and motion of its corresponding feature encoded therein.

In order to generate the joint semantic vectors, the CP module identifies pairings of a given feature with its corresponding features found by the similarity search. The CP module generates a concatenated vector for each pairing comprised of the semantic vectors for each feature in a pair and the spatiotemporal displacement between the two. In other words, each concatenated vector includes two semantic vectors and spatiotemporal displacement information. In an alternative, each concatenated vector could include a distance between the two semantic vectors instead of the two semantic vectors themselves. A set of concatenated vectors corresponding to the feature pairs are thus produced by the CP module.

The concatenated vectors may be fed into one or more internal neural networks that differ from the main neural network that extracted the features from the video. Whereas the main neural network extracted features from the video, the internal neural networks are trained to approximate a set function. In some cases, the internal neural networks are multi-layer perceptron (MLP) neural networks. The internal neural networks take the concatenated vectors as input, perform the set function on the vectors, and output potential joint semantic vectors.

Each potential joint semantic vector that is output corresponds to one of the concatenated vectors that was supplied as input and includes a numeric or symbolic semantic representation of the motion learned from the concatenated vector. Multiple potential joint semantic vectors are therefore produced that correspond to the multiple concatenated vectors supplied as input to the internal neural networks.

The potential joint semantic vectors are then aggregated by a pooling operation, examples of which include max pooling, average pooling, and the like. The output of the pooling operation is the joint semantic vector that represents the motion of the feature in the video. The CP module produces a joint semantic vector in this manner for each feature in the video.

The final output of the CP module is thus a set of joint semantic vectors corresponding to the features extracted by the main artificial neural network from the video. The joint semantic vectors are fed as input to the main artificial neural network. The artificial neural network, having been trained on such data, can recognize and classify motion in the video from the signals produced by the neurons in the neural network in response to the joint semantic vectors. For example, the artificial neural network may recognize the dribbling of a basketball, the rolling of a can, or a human gesture from the joint semantic vectors generated by the CP module.

FIG. 1 illustrates learning architecture 100 in an implementation. Learning architecture 100 includes artificial neural network 101 (herein referred to as neural network 101).

Figure 8:
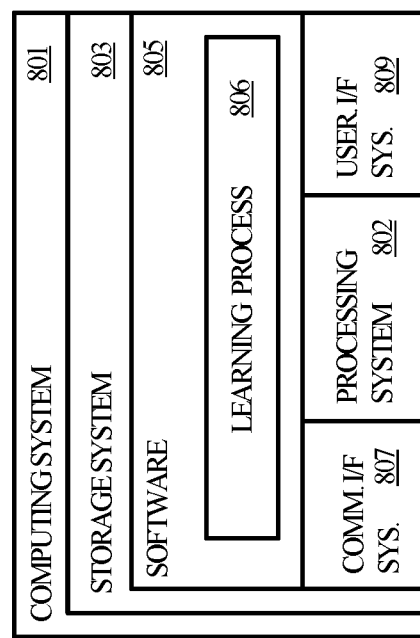
FIG. 8 illustrates a computing system suitable for implementing the various operational environments, modules, architectures, processes, scenarios, and sequences discussed below with respect to the Figures.

Neural network 101 includes various layers represented by layer 103 and layer 105. Neural network 101 also includes a correspondence proposal (CP) module 104 inserted between layer 103 and layer 105. Learning architecture 100 may be implemented in hardware, software, or firmware, and on one or more physical or virtual computing systems, of which computing system 801 in FIG. 8 is representative.

Neural network 101 is representative of any type of artificial neural network capable of learning motion in video data. Examples of neural network 101 include, but are not limited to, convolutional neural networks (CNNs), 3D CNNs, and any other type of deep learning artificial neural network.

Neural network 101 takes video data 107 as input and provides an indication 109 of motion learned from the video data 107 as output. For example, the video data 107 may include representations of an object moving through a scene, a human gesture, or the like, which neural network 101 is able to recognize and classify (i.e. learn). The video data 107 may include the red-green-blue (RGB) values of the pixels in the video or alternative representations of RGB values such as hue-saturation-value (HSV) and hue-saturation-lightness (HSL) values. In some cases, the video data 107 includes primarily RGB values. For example, at least half of the video data 107 may be RGB values. In some cases, the video data 107 includes only RGB values. It may also be appreciated that neural network 101 could also be capable of taking any type of dynamic data as input and recognizing a variety of dynamic behaviors represented in the data.

Layer 103 of neural network 101 is representative of one or more layers of neurons capable of taking video data as input and extracting features from the video. Layer 105 of neural network 101 is representative of one or more neuron layers capable of taking joint semantic vectors as input, extracting (or learning) motion from the joint semantic vectors, and outputting an indication of the learned motion.

CP module 104 takes the features extracted by layer 103 as input and generates the joint semantic vectors to be output to layer 105. In some implementations, the features extracted by layer 103 are presented to CP module 104 in a video representation tensor. In such instances, CP module 104 adds the resulting joint semantic vectors back to the video representation tensor and feeds the modified video representation tensor to layer 105. In some scenarios, the joint semantic vectors replace the original semantic vectors associated with the features to which the joint semantic vectors correspond.

Video data 107 is representative of one or more segments of video from which layer 103 may extract features. Video data 107 includes frames 108 having features that may be discovered by layer 103. The location of each of the features in the video may be defined in terms of the height (H), width (W), and frame (T) at which a given feature is found in the video.

Indication 109 is representative of the ultimate outcome of learning architecture 100, such as a description of the motion of an object or entity in video data 107. That is, neural network 101 may be capable of describing what a particular feature is and the nature of its motion in the video. The indication 109 may be in the form of a report, a message, a database entry, an inter-process message, an intra-process message, displayed information, recorded data, or any other type of indication.

Figure 2:
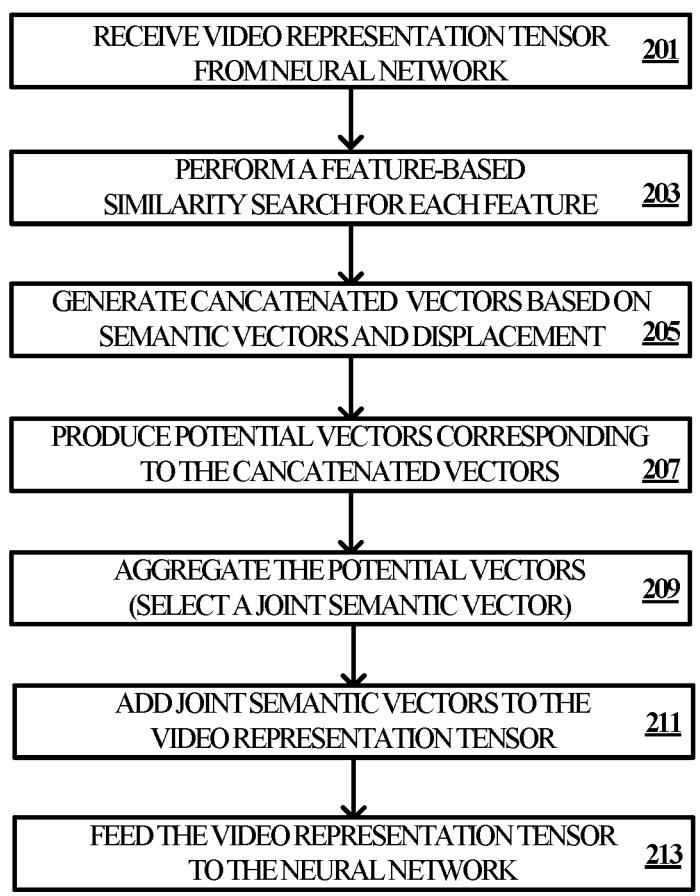
FIG. 2 illustrates a learning process in an implementation.

CP module 104 is representative of any hardware and/or software element(s) capable of producing joint semantic vectors from features extracted from video as described herein. CP module 104 employs a learning process 200 to extract the joint semantic vectors from which motion may be learned by other portions of neural network 101. Learning process 200 may be implemented in program instructions in the context of any of the hardware, software applications, modules, components, or other such programming elements that may comprise CP module 104. The program instructions direct the underlying physical or virtual computing system(s) to operate as described for learning process 200, referring parenthetically to the steps in FIG. 2.

In operation, CP module 104 receives a video representation tensor from layer 103 (step 201). The input and output of CP module 104 are both video representation tensors with shape THW×C, where T denotes the number of frames, H×W denotes the spatial dimension, and C denotes the number of channels.

CP module 104 views the video representation tensor as a point cloud whose data points correspond to the features extracted by layer 103 from video data 107. Each point is defined in the tensor in terms of the spatiotemporal location of one of the features extracted from the video. In this example, the spatiotemporal locations of the features are denoted by their THW coordinates in the video. In addition, a semantic vector is provided for each point that represents describable dimensions of the feature. Many dimensions are possible and depend on the configuration of layer 103. In some cases, the semantic vectors may include information derived primarily from the red-green-blue (RGB) values input to artificial neural network 101.

CP module 104 performs, for each feature represented in the tensor, a vector-based similarity search of the other features in the tensor (step 203). The similarity search considers the semantic vectors of the other features in the video, but it may exclude those in the same frame as a given feature.

The results of the similarity search for each feature is a group of corresponding features that may be associated with the given feature. Various feature pairs may be formed between a given feature and its corresponding features. As an example, a similarity search may identify the top k features having semantic vectors most similar to the semantic vector of a given feature. Thus, k feature pairs may be formed between the given feature and each of the corresponding features.

CP module 104 generates a concatenated vector for each feature pair formed between a given feature and its corresponding features (step 205). The concatenated vector includes the semantic vector for the given feature, the semantic vector for the corresponding (or paired) feature, and a spatiotemporal displacement between the two. In some implementations, the concatenated vector may include the distance (or difference) between the two semantic vectors, rather than the vectors themselves.

The concatenated vectors are fed into one or more internal neural networks trained to approximate a set function. The internal neural networks, which differ from the main artificial neural network represented by neural network 101, take the concatenated vectors as input and produce potential joint semantic vectors (step 207). In some cases, a one-to-one correspondence exists between the number of concatenated vectors CP module 104 produces and the number of internal neural networks that exist. In this manner, the concatenated vectors may be fed into the internal neural networks in parallel.

The outputs of the internal neural networks are aggregated by a pooling operation (e.g. a max pooling operation), the output of which becomes the joint semantic vector for a given feature (step 209). CP module 104 adds the joint semantic vectors to the original video representation tensor or to a new video representation tensor (step 211). CP module 104 then feeds the video representation tensor—with the joint semantic vectors included therein—to layer 105 of neural network 101 (step 213). One or more layers of neural network 101, including layer 105, proceed to process the joint semantic vectors and the signals they produce to arrive at the indication 109 of motion recognized in video data 107.

Figure 3:
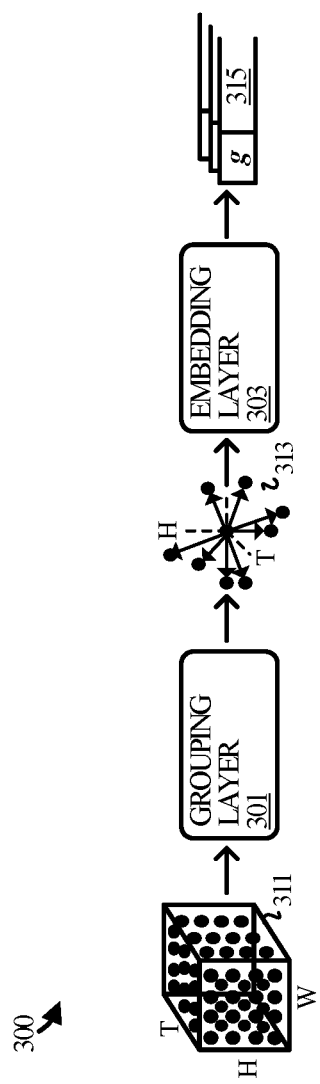
FIG. 3 illustrates a correspondence proposal module in an implementation.

FIG. 3 illustrates a more detailed view of a CP module 300 and its operations in an implementation. CP module 300 includes grouping layer 301 and embedding layer 303. Grouping layer 301 is representative of any one or more hardware, software, or firmware elements of CP module 300 capable of identifying the sets of corresponding features for each feature extracted from a video. Embedding layer 303 is representative of any one or more hardware, software, or firmware elements of CP module 300 capable of producing concatenated vectors and deriving a joint semantic vector from the concatenated vectors.

Grouping layer 301 takes a video representation tensor 311 as input and selects for each feature its k most likely corresponding features in the tensor. Video representation tensor 311 is viewed by grouping layer 301 as a three-dimensional point cloud in which its points, defined in terms of their THW coordinates in the point cloud, represent the features extracted from a video by a neural network. Grouping layer 301 performs a semantic similarity search for each one of the features, which results in a group of features associated with a given feature. The search may be based solely on semantic similarity to ensure that correspondence can be identified across arbitrarily long spatiotemporal ranges. Features within the same frame may be excluded to ensure temporal consistency between frames. For example, correspondence set 313 includes one feature/point at its center and 8 different features/points surrounding it. Each of the 8 other points represent a feature in a different frame of video that has the same or a similar semantic vector relative to the feature/point at the center of the set.

Each of the features/points are located a certain distance away from the center feature/point of the correspondence set 313, which can be calculated by subtracting their THW coordinates from those of the center feature. The displacement then is a vector that represents the distance and direction of each of the features in the group from the central feature.

Embedding layer 303 takes the identified correspondence groups as input and produces a joint semantic vector 315 for each feature as output. In between, embedding layer 303 generates concatenated vectors from the semantic vectors associated with the features in the correspondence groups. In addition, embedding layer 303 generates potential joint semantic vectors from the concatenated vectors and the joint semantic vector 315 ("g") from the potential joint semantic vectors. The resulting joint semantic vectors for the features may be mixed back into the original or a different video representation tensor and fed into one or more neural networks.

Figure 4:
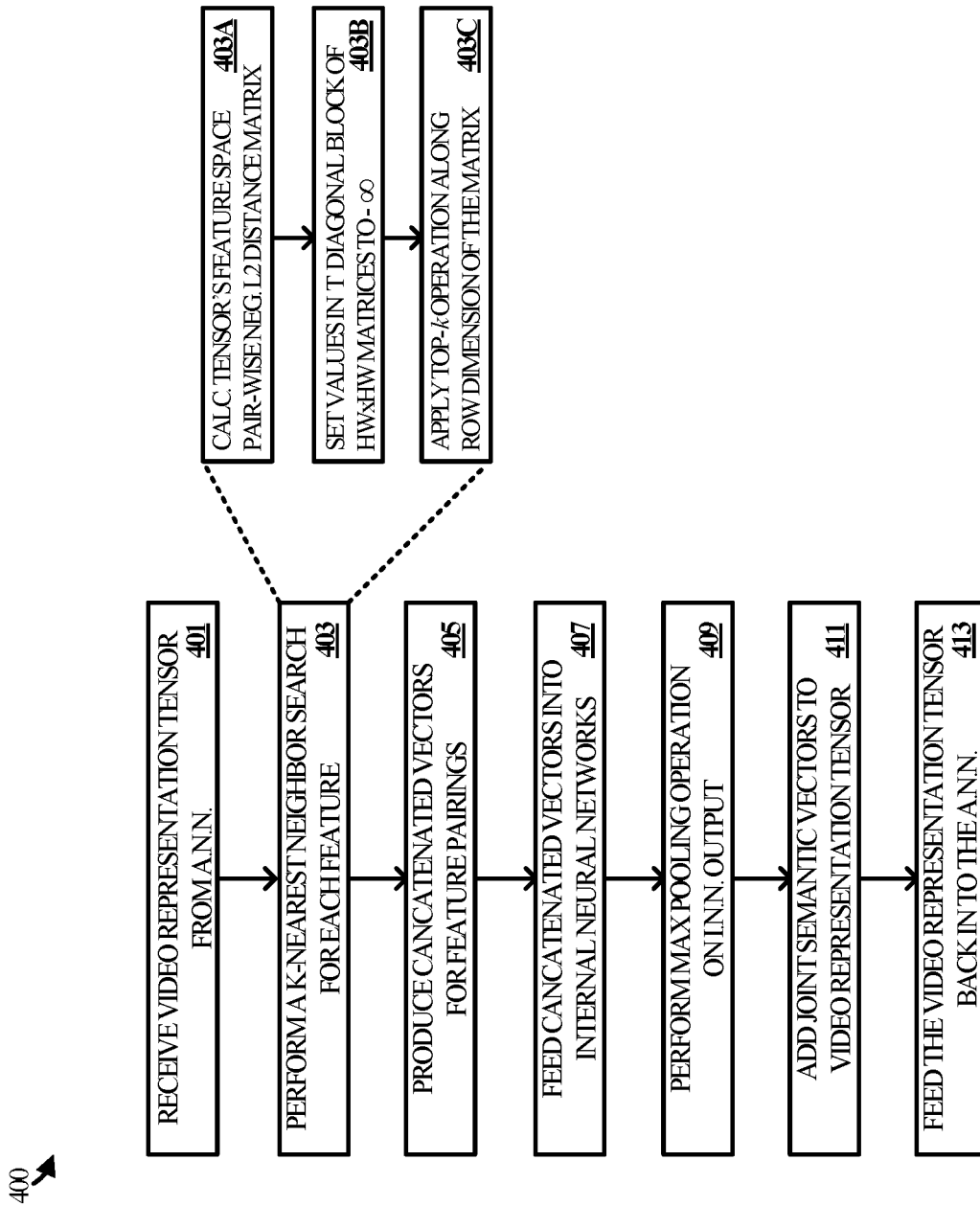
FIG. 4 illustrates another learning process in an implementation.

FIG. 4 illustrates learning process 400 in an implementation, which is an example of another learning process that could be employed by the elements of CP module 300. Learning process 400 may also be implemented in program instructions in the context of any of the hardware, software applications, modules, components, or other such programming elements deployed in the various elements of CP module 300. The program instructions direct the underlying physical or virtual computing system(s) to operate as described for learning process 400, referring parenthetically to the steps in FIG. 4.

In operation, grouping layer 301 receives video representation tensor 311 from an artificial neural network (step 401). For each of the features (or points) in the tensor, grouping layer 301 performs a k-nearest neighbor search to identify the top-k elements having the most similar semantic vector to that of a given feature (step 403).

In some implementations, step 403 includes calculating a tensor's feature space pair-wise negative $L_2$ distance matrix of shape THW×THW (step 403A), which can be done efficiently with matrix multiple operations. The negative $L_2$ distance can be used as the metric to compare between pairs of a given feature and other features in the tensor.

Next, grouping module 301 sets the values of the features in the T diagonal block matrices of shape HW×HW to negative ∞ (step 403B). This step serves to exclude features within the same frame as a given feature from being selected by the similarity search as potentially corresponding features. Last, grouping module 301 applies an arg top-k operation along the row dimension of the matrix (step 403C), which outputs a tensor of shape THW×k, where the i-th row are the indices of the k-nearest neighbors of the i-th feature.

Having found the nearest neighbors for a feature, embedding layer 303 produces concatenated vectors for each paring of a given feature with the respective ones of its corresponding features (step 405). The pairings are each comprised of a given feature for which the pairings are being produced and a different one of the top-k features found to be most similar to the feature. Each of the concatenated vectors includes the two semantic vectors for the two features in a corresponding pair, as well as the spatiotemporal displacement of one feature relative to the other. The displacement may be calculated by subtracting the corresponding coordinate values from each other (e.g. t-t, h-h, and w-w).

Next, embedding layer 303 feeds the concatenated vectors into one or more internal neural networks (step 407). The internal neural networks in some implementations may be multi-layer perceptrons with shared weights and trained to approximate a set function. The internal neural networks output potential joint semantic vectors as a result of the signals the concatenated vectors produce in the internal neural networks.

After feeding the concatenated vectors into the internal neural networks, embedding layer 303 performs a max pooling operation on the aggregated outputs of the internal neural networks (step 409). The max pooling operation is performed on the potential joint semantic vectors to select the signals most informative about a given feature's correspondence. The resulting joint semantic vector has appearance and motion implicitly encoded therein due to the entangled representation that occurs by mixing semantic vectors and displacement in the concatenated vectors fed into the internal neural networks.

Embedding layer 303 adds the resulting joint semantic vectors for the features back into the video representation tensor (step 411) and feeds the modified video representation tensor back into the main neural network (step 413). The main neural network takes the modified video representation tensor as input, which produces signals in the various remaining layers of the main neural network. The signals ultimately produce an output from the main neural network that classifies the motion found in the segment of video from which the features were extracted.

Figure 5:
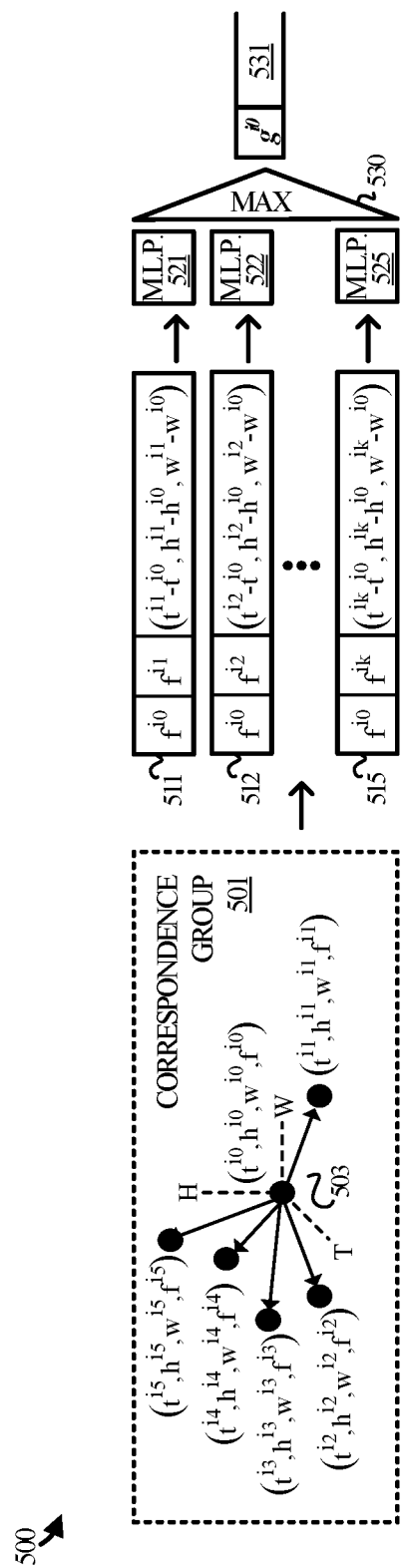
FIG. 5 illustrates an operational scenario in an implementation.

FIG. 5 illustrates an operational scenario 500 in another implementation of enhanced motion learning. Operational scenario 500 illustrates the process involved with generating a joint semantic vector for a single feature extracted from a video. Operational scenario 500 would be repeated for many or all of the features extracted from a video to produce many joint semantic vectors to be supplied as input to a convolutional neural network. The convolutional neural network would then be able to identify motion occurring in the video.

In operation, a grouping layer identifies a correspondence group 501 for the features based on a k-nearest neighbor (k-NN) search of the other features extracted from the video. Correspondence group 501 is centered on feature 503 represented by $i^0$, having coordinates $[t^{i0}, h^{i0}, w^{i0}]$ and semantic vector $f^{i0}$.

Correspondence group 501 includes five other features in the THW space found to be the top k most similar to feature 503, denoted by their respective coordinates and semantic vectors as follows: 1) feature $i^1$, having coordinates $[t^{i1}, h^{i1}, w^{i1}]$ and semantic vector $f^{i1}$; 2) feature $i^2$, having coordinates $[t^{i2}, h^{i2}, w^{i2}]$, and semantic vector $f^{i2}$; 3) feature $i^3$, having coordinates $[t^{i3}, h^{i3}, w^{i3}]$, and semantic vector $f^{i3}$; 4) feature $i^4$, having coordinates $[t^{i4}, h^{i4}, w^{i4}]$, and semantic vector $f^{i4}$; and 5) feature $i^5$, having coordinates $[t^{i5}, h^{i5}, w^{i5}]$, and semantic vector $f^{i5}$.

An embedding layer takes correspondence group 501 as input and produces concatenated vectors 511-515 corresponding to the pairings of feature 503 with each of its corresponding features. The concatenated vectors each include two semantic vectors and spatiotemporal displacement information. For example, concatenated vector 511 includes semantic vectors $f^{i0}$ and $f^{i1}$ and the displacement produced by $[t^{i0}, h^{i0}, w^{i0}]-[t^{i1}, h^{i1}, w^{i1}]$; concatenated vector 512 includes semantic vectors $f^{i0}$ and $f^{i2}$ and the displacement produced by $[t^{i0}, h^{i0}, w^{i0}]-[t^{i2}, h^i, w^{i2}]$; and so on until concatenated vector 515, which includes semantic vectors $f^{i0}$ and $f^{i5}$ and the displacement produced by $[t^{i0}, h^{i0}, w^{i0}]-[t^{i5}, h^{i5}, w^{i5}]$.

The embedding layer feeds the concatenated vectors 511-515 into MLP-type neural networks represented by MLPs 521-525. For instance, concatenated vector 511 is fed into MLP 521; concatenated vector 512 is fed into MLP 522; and concatenated vector 515 is fed into MLP 525. MLPs 521-525 are trained to approximate a set function. Accordingly, they each apply the set function to their respective concatenated vectors to output potential joint semantic vectors.

The embedding layer aggregates the potential joint semantic vectors in max pooling operation 530. Max pooling operation 530 functions to extract the most important signals from the potential joint semantic vectors produced by MLPs 521-525. The result of the max pooling operation is joint semantic vector 531, represented by $g^{i0}$.

Figure 6:
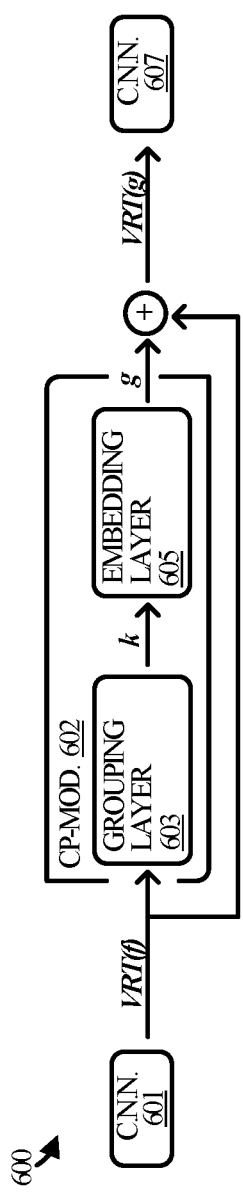
FIG. 6 illustrates a learning architecture in an implementation.

FIG. 6 illustrates a learning architecture 600 in an implementation. Learning architecture 600 includes convolutional neural network 601, CP module 602, and convolutional neural network 607. Convolutional neural network 601 and convolutional neural network 607 may be representative of separate neural networks or different layers of the same neural network. CP module 602 includes grouping layer 603 and embedding layer 605. Learning architecture 600 may be implemented in hardware, software, or firmware, and on one or more physical or virtual computing systems, of which computing system 801 in FIG. 8 is representative.

In operation, convolutional neural network 601 extracts features from a video and provides both semantic and spatiotemporal information for each feature to CP module 602 in a video representation tensor (VRT). Examples of features include objects, edges, pixels, or other such elements that may be extracted from the video. The semantic information describes numerically or symbolically one or more properties of a given feature such as its color components, length, area, circularity, gradient magnitude, gradient direction, texture, or grey-scale intensity, for example. The spatiotemporal information describes a feature by its spatial position in a frame and its temporal position in the video.

Grouping layer 603 in CP module 602 searches for a set of corresponding features for each feature extracted from the video. The k features are passed to embedding layer 605.

Embedding layer 605 generates concatenated vectors for feature pairs formed by a given feature and its corresponding features. The concatenated vectors include the semantic information included in the VRT for both features in a pair, as well as the spatiotemporal information (or a difference/displacement between them).

Embedding layer 605 then feeds the concatenated vectors into MLP neural networks trained to approximate a set function. The outputs of the MLP neural networks are aggregated by a max pooling function, which produces the joint semantic vector represented by "g." The joint semantic vectors may be added to the original video representation tensor, resulting in a modified video representation tensor (VRT'). VRT' may then be fed into convolutional neural network 607. Convolutional neural network 607 responds to the signals produced by VRT' to output an indication of motion recognized in the video by its layers of neurons.

Figure 7:
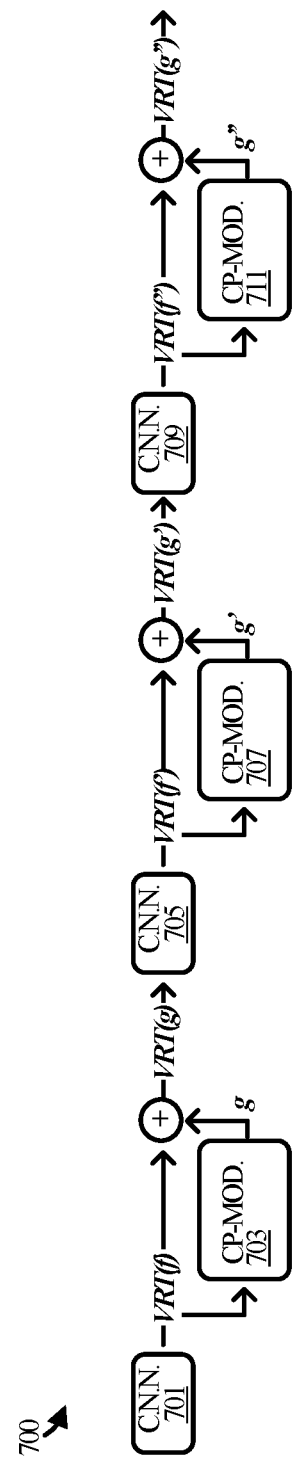
FIG. 7 illustrates another learning architecture in an implementation.

FIG. 7 illustrates another learning architecture 700 in an implementation. Learning architecture 700 includes multiple convolutional neural networks (or different layers of the same convolutional neural network) represented by CNN 701, CNN 705, and CNN 709. CP module 703 is inserted between CNN 701 and CNN 705. CP module 707 is inserted between CNN 705 and CNN 709. Finally, CP module 711 is inserted after CNN 709.

In operation, CNN 701 extracts features from a video and provides both semantic and spatiotemporal information for each feature to CP module 703 in a video representation tensor—VRT(f). As mentioned, examples of features include objects, edges, pixels, or other such elements that may be extracted from the video. The semantic information describes numerically or symbolically one or more properties of a given feature such as its color components, length, area, circularity, gradient magnitude, gradient direction, texture, or grey-scale intensity, for example. The spatiotemporal information describes a feature by its spatial position in a frame and its temporal position in the video.

CP module 703 operates as describe above with respect to CP module 602. Namely, CP module 703 identifies a k-NN set of corresponding features for each feature in VRT(f). CP module 703 then produces concatenated vectors from the correspondence pairs, feeds the concatenated vectors into MLPs, and aggregates the potential vectors output by the MLPs in a max pooling function. The output of the max pooling function is a joint semantic vector represented by "g." The resulting joint semantic vectors produced for the features in VRT(f) are added back to it VRT—replacing the original semantic vectors associated with the features—resulting in VRT(g).

CNN 705 takes VRT(g) as input and extracts features from it with a different focus than CNN 701. The result is VRT(f'), which CNN 705 supplies to CP module 707. In other words, at least some of the features represented in VRT(f') differ from those represented in VRT(f) since the focus of CNN 705 differs relative to CNN 701 and because their inputs differ.

CP module 707 operates as describe above with respect to CP module 602. Namely, CP module 707 identifies a k-NN set of corresponding features for each feature in VRT(f'). CP module 707 then produces concatenated vectors from the correspondence pairs, feeds the concatenated vectors into MLPs, and aggregates the potential vectors output by the MLPs in a max pooling function. The output of the max pooling function is a joint semantic vector represented by "g'." The resulting joint semantic vectors produced for the features in VRT(f') are added back to it, resulting in VRT(g').

CNN 709 takes VRT(g') as input and extracts features from it with a different focus than CNN 705. The result is VRT(f"), which CNN 709 supplies to CP module 711. At least some of the features represented in VRT(f") differ from those represented in VRT(f') since the focus of CNN 709 differs relative to CNN 705 and because their inputs differ.

CP module 711 operates as describe above with respect to CP module 602. Namely, CP module 711 identifies a k-NN set of corresponding features for each feature in VRT(f"). CP module 711 then produces concatenated vectors from the correspondence pairs, feeds the concatenated vectors into MLPs, and aggregates the potential vectors output by the MLPs in a max pooling function. The output of the max pooling function is a joint semantic vector represented by "g"." The resulting joint semantic vectors produced for the features in VRT(f") are added back to it, resulting in VRT(g").

This process may terminate after CP module 711, with VRT(g") being sent into the remaining layers of a CNN. Optionally, the process may continue for one or more iterations until the video representation tensor is sent into the remaining layers. The remaining layers of the CNN responds to the signals produced by the video representation tensor to output an indication of motion recognized in the video by the layers.

In some implementations, the correspondence modules disclosed herein may be inserted into CNN architectures and interleaved with convolution layers. Such an architecture allows the static image features from convolution layers and motion signals extracted by the correspondence modules to be mixed and learned jointly.

In a specific example, a correspondence module may be inserted into a C2D ResNet architecture, where the module is located just after a residual block. The time dimension may be abandoned completely, which keeps the temporal size T the same during feed forward. Rather, the correspondence modules can be relied upon for capturing temporal information. The nearest neighbors found by the correspondence modules may be determined at any metric space, such as temporal-only space, spatiotemporal space, feature space, or spatiotemporal-feature space, although the discussion herein is focused on feature space.

The C2D portion of the architecture may be initialized with a pretrained ImageNet model. The MLPs in the correspondence modules may be randomly initialized with MSRA initialization, except for the gamma parameter of the last batch normalization layer being initialized with all zeros. This ensures identify mapping at the start of training so that the pretrained image feature extractor can be used.

It may be appreciated from the foregoing that the correspondence proposal modules discussed herein compute correspondence pairs for each feature in a tensor and feed the proposed pairs into a shared neural network, followed by max pooling, to learn a new feature tensor. In this manner, the modules may effectively capture motion correspondence information in videos. The proposed correspondence module may be integrated with existing frame-based or clip-based architectures. In addition, the proposed correspondence module has been tested against standard video recognition benchmarks and achieved strong performance.

FIG. 8 illustrates computing system 801 that is representative of any system or collection of systems in which the various modules, processes, programs, and scenarios disclosed herein may be implemented. Examples of computing system 801 include, but are not limited to, server computers, cloud computing platforms, and data center equipment, as well as any other type of physical or virtual server machine, container, and any variation or combination thereof. Other examples include desktop computers, laptop computers, tablet computers, Internet of Things (IoT) devices, wearable devices, and any other physical or virtual combination or variation thereof.

Computing system 801 may be implemented as a single apparatus, system, or device or may be implemented in a distributed manner as multiple apparatuses, systems, or devices. Computing system 801 includes, but is not limited to, processing system 802, storage system 803, software 805, communication interface system 807, and user interface system 809 (optional). Processing system 802 is operatively coupled with storage system 803, communication interface system 807, and user interface system 809.

Processing system 802 loads and executes software 805 from storage system 803. Software 805 includes and implements learning process 806, which is representative of the learning processes discussed with respect to the preceding Figures. When executed by processing system 802 to provide enhanced representation learning, software 805 directs processing system 802 to operate as described herein for at least the various processes, operational scenarios, and sequences discussed in the foregoing implementations. Computing system 801 may optionally include additional devices, features, or functionality not discussed for purposes of brevity.

Referring still to FIG. 8, processing system 802 may comprise a micro-processor and other circuitry that retrieves and executes software 805 from storage system 803. Processing system 802 may be implemented within a single processing device but may also be distributed across multiple processing devices or sub-systems that cooperate in executing program instructions. Examples of processing system 802 include general purpose central processing units, graphical processing units, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 803 may also include computer readable communication media over which at least some of software 805 may be communicated internally or externally. Storage system 803 may be implemented as a single storage device but may also be implemented across multiple storage devices or sub-systems co-located or distributed relative to each other. Storage system 803 may comprise additional elements, such as a controller, capable of communicating with processing system 802 or possibly other systems.

Software 805 (including learning process 806) may be implemented in program instructions and among other functions may, when executed by processing system 802, direct processing system 802 to operate as described with respect to the various operational scenarios, sequences, and processes illustrated herein. For example, software 805 may include program instructions for implementing a learning process to learn motion in video as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software, virtualization software, or other application software. Software 805 may also comprise firmware or some other form of machine-readable processing instructions executable by processing system 802.

In general, software 805 may, when loaded into processing system 802 and executed, transform a suitable apparatus, system, or device (of which computing system 801 is representative) overall from a general-purpose computing system into a special-purpose computing system customized to provide motion learning. Indeed, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors.

For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 807 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A method comprising:
   in an artificial neural network, extracting from a video, visual features and semantic vectors associated with the visual features;
   for a visual feature of the visual features extracted from the video:
      performing a similarity search for corresponding visual features in the video based at least on the semantic vectors associated with the visual features;
      generating a joint semantic vector based at least on a first semantic vector associated with the visual feature, a second semantic vector associated with at least one of the corresponding visual features, and a spatiotemporal distance of the visual feature to the at least one of the corresponding visual features; and
      in the artificial neural network, classifying whether a particular type of motion is present in the video based at least on the joint semantic vector generated for the visual feature.

2. The method of claim 1 wherein performing the similarity search for the corresponding visual features in the video comprises performing a nearest neighbor search based on the semantic vectors.

3. The method of claim 2 wherein performing the nearest neighbor search comprises excluding those of the visual features in a same frame of the video as the visual feature.

4. The method of claim 3 wherein the video comprises red-green-blue (RGB) values of pixels in the video.

5. The method of claim 4 wherein performing the nearest neighbor search comprises comparing of the first semantic vector associated with the visual feature to others of the semantic vectors to identify a top-k of the visual features most similar to the visual feature.

6. The method of claim 5 wherein generating the joint semantic vector for at least the visual feature comprises:
   identifying pairings of the visual feature with each of the corresponding visual features, wherein each of the pairings comprises the visual feature and a corresponding visual feature that differs relative to the corresponding visual feature in each other of the pairings;
   generating concatenated vectors, wherein each of the concatenated vectors corresponds to a different one of the pairings, wherein each of the concatenated vectors comprises the first semantic vector associated with the visual feature, a corresponding semantic vector associated with the corresponding visual feature in a corresponding pairing, and the spatiotemporal distance of the visual feature to the corresponding visual feature;
   generating potential vectors based on the concatenated vectors; and
   performing a max pooling operation on the potential vectors to produce the joint semantic vector.

7. The method of claim 6 wherein the artificial neural network comprises a convolutional neural network and wherein generating the potential vectors based on the concatenated vectors comprises feeding the concatenated vectors into a multilayer perceptron (MLP) neural network.

8. A method comprising:
   in an artificial neural network, generating a feature tensor comprising visual features extracted from image data and locations of the visual features in the image data;
   for a visual feature in the feature tensor:
      performing a search for corresponding visual features in the image data based on a semantic similarity of the visual feature to other visual features in the feature tensor;
      generating a joint semantic vector based at least on the semantic similarity of the visual feature to one or more of the corresponding visual features and a spatiotemporal distance of the visual feature to the one or more of the corresponding visual features;
      adding the joint semantic vector to the feature tensor; and
      feeding the feature tensor, having the joint semantic vector included therein, back into the artificial neural network.

9. The method of claim 8 wherein performing the search for the corresponding visual features in the image data comprises performing a nearest neighbor search based on the semantic similarity of the visual feature to the other visual features and excluding those of the visual features in a same image of the image data as the visual feature.

10. The method of claim 9:
    wherein the feature tensor further comprises semantic vectors associated with the visual features; and
    wherein performing the nearest neighbor search comprises performing a comparison of a semantic vector associated with the visual feature to those of the semantic vectors associated with the other visual features to identify a top-k of the visual features most similar to the visual feature.

11. The method of claim 10 wherein generating the joint semantic vector for each of the visual features comprises:
    identifying pairings of the visual feature with each of the corresponding visual features, wherein each of the pairings comprises the visual feature and a corresponding visual feature that differs relative to the corresponding visual feature in each other of the pairings;
    generating concatenated vectors, wherein each of the concatenated vectors corresponds to a different one of the pairings, wherein each of the concatenated vectors comprises the semantic vector associated with the visual feature, a corresponding semantic vector associated with the corresponding visual feature in a corresponding pairing, and the spatiotemporal distance of the visual feature to the corresponding visual feature;

generating potential vectors based on the concatenated vectors; and performing a max pooling operation on the potential vectors to produce the joint semantic vector.

12. The method of claim 11 further comprising, in the artificial neural network, processing the feature tensor to extract motion from the image data.

13. The method of claim 12;

wherein the artificial neural network comprises a convolutional neural network; and wherein generating the potential vectors based on the concatenated vectors comprises feeding the concatenated vectors into a multilayer perceptron (MLP) neural network.

14. The method of claim 13 wherein the image data is associated with a video and wherein the visual features correspond to objects in the video.

15. A computing apparatus comprising:

one or more computer readable storage media; and program instructions stored on the one or more computer readable storage media that, when executed by a processing system, direct the computing apparatus to at least:

generate a video representation tensor comprising visual features extracted from a video and locations of the visual features in the video;

for a visual feature of the visual features extracted from the video:

perform a search for corresponding visual features in the video based on a semantic similarity of the visual feature to other visual features;

generate a joint semantic vector based at least on the semantic similarity of the visual feature to one or more of the corresponding visual features and a spatiotemporal distance of the visual feature to the one or more of the corresponding visual features; and add the joint semantic vector to the video representation tensor.

16. The computing apparatus of claim 15 wherein the search for the corresponding visual features in the video comprises a nearest neighbor search and wherein the nearest neighbor search excludes those of the visual features in a same frame of the video as the visual feature.

17. The computing apparatus of claim 16:

wherein the video representation tensor further comprises semantic vectors associated with the visual features; and wherein the nearest neighbor search comprises a comparison of a semantic vector associated with the visual feature to those of the semantic vectors associated with the other visual features to identify a top-k of the visual features most similar to the visual feature.

18. The computing apparatus of claim 17 wherein, to generate the joint semantic vector for the visual feature, the program instructions direct the computing apparatus to:

identify pairings of the visual feature with each of the corresponding visual features, wherein each of the pairings comprises the visual feature and a corresponding visual feature that differs relative to the corresponding the visual feature in each other of the pairings;

generate inputs, wherein each of the inputs corresponds to a different one of the pairings, wherein each of the inputs comprises the semantic vector associated with the visual feature, a corresponding semantic vector associated with the corresponding pairing, and the spatiotemporal distance of the visual feature to the corresponding visual feature;

feed the inputs into multilayer perceptron (MLP) neural network to produce outputs; and perform a max pooling operation on the outputs of the MLP neural network to produce the joint semantic vector.

19. The computing apparatus of claim 18 wherein:

the video comprises red-green-blue (RGB) values of pixels in the video; and the top-k of the visual features most similar to the visual feature comprises eight of the visual features most similar to the visual feature.

20. The computing apparatus of claim 19 wherein an artificial neural network of the computing apparatus comprises a convolutional neural network.

* * * * *